(12) United States Patent
Taden et al.

(10) Patent No.: US 8,143,363 B2
(45) Date of Patent: Mar. 27, 2012

(54) POLYMERIZABLE COMPOSITION

(75) Inventors: Andreas Taden, Duesseldorf (DE);
Stefan Kreiling, Duesseldorf (DE);
Rainer Schoenfeld, Duesseldorf (DE);
Yusuf Yagci, Istanbul (TR); **Baris
Kiskan, Istanbul (TR); Aydogan
Binnur**, Istanbul (TR)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/987,238

(22) Filed: Jan. 10, 2011

(65) Prior Publication Data

US 2011/0105680 A1 May 5, 2011

Related U.S. Application Data

(63) Continuation of application No. PCT/EP2009/057618, filed on Jun. 18, 2009.

(30) Foreign Application Priority Data

Jul. 9, 2008 (DE) .......................... 10 2008 032 176

(51) Int. Cl.
*C08G 77/04* (2006.01)
(52) U.S. Cl. .......................................................... 528/10
(58) Field of Classification Search ................ 528/10–43
See application file for complete search history.

(56) References Cited

U.S. PATENT DOCUMENTS

| | | | |
|---|---|---|---|
| 4,607,091 A | 8/1986 | Schreiber | |
| 5,021,484 A | 6/1991 | Schreiber et al. | |
| 5,200,452 A | 4/1993 | Schreiber | |
| 5,322,945 A | 6/1994 | Krongauz et al. | |
| 5,473,068 A | 12/1995 | Krongauz et al. | |
| 5,663,042 A * | 9/1997 | Grieve et al. | 430/619 |
| 5,973,144 A * | 10/1999 | Ishida | 544/73 |
| 6,207,786 B1 | 3/2001 | Ishida et al. | |
| 6,620,925 B1 | 9/2003 | Noteborn | |
| 6,660,394 B1 | 12/2003 | Ishizuki et al. | |
| 6,743,852 B2 * | 6/2004 | Dershem et al. | 524/548 |
| 2009/0234079 A1* | 9/2009 | Burns et al. | 525/435 |

FOREIGN PATENT DOCUMENTS

| | | |
|---|---|---|
| JP | 2007-154018 | 6/2006 |
| JP | 2007-106800 | 4/2007 |
| JP | 2007106800 A | 4/2007 |
| JP | 2007-146070 | 6/2007 |
| JP | 2007146070 A | 6/2007 |
| JP | 2007154018 A | 6/2007 |

OTHER PUBLICATIONS

Liu et al. "Silicon-Containing Benzoxazines and Their Polymers: Copolymerization and Copolymer Properties" Journal of Polymer Science: Part A: Polymer Chemistry, 2007, 45, 1007-1015.*

(Continued)

*Primary Examiner* — Robert Loewe (57) ABSTRACT

The present invention relates to a polymerizable composition comprising, as a component A, at least one silicon-organic compound having at least two ≡Si—H groups that are reactive in the hydrosilylation reaction and, as a component B, at least one benzoxazine compound having at least two unsaturated carbon-carbon bonds that are reactive in the hydrosilylation reaction with the component A. Additional objects of the present invention include adhesives, sealants or coatings containing the polymerizable composition according to the invention, and the polymerization products of said components.

15 Claims, 1 Drawing Sheet

OTHER PUBLICATIONS

Lee et al. "Synthesis and characterization of polybenzoxazine networks nanocomposites containing multifunctional polyhedral oligomeric silsesquioxane (POSS)" Polymer, 2006, 47, 4378-4386.*

Lee et al. "Synthesis and characterizations of a vinyl-terminated benzoxazine monomer and its blending with polyhedral oligomeric silsesquioxane (POSS)" Polymer 2005, 46, 2320-2330.*

Ghosh et al. "Polybenzoxazines-New high performance thermosetting resins: Synthesis and properties" Progress in Polymer Science 2007, 32, 1344-1391.*

Huang et al. "Preparation of VB-a/POSS Hybrid Monomer and Its Polymerization of Polybenzoxazine/POSS Hybrid Nanocomposites" Journal of Applied Polymer Science, vol. 111, 628-634, 2009.*

Kiskan et al. "Synthesis, Characterization, and Thermally Activated Curing of Oligosiloxanes Containing Benzoxazine Moieties in the Main Chain" Journal of Polymer Science: Part A: Polymer Chemistry, vol. 47, 804-811, 2009.*

F.C. Chang et al., Synthesis thermal properties, and phase morpologies of novel benzoxazines functionalized with polyhedral oligomeric silsesquioxane vol. 45, No. 18, 6321-6331 (2004.

Lee, Yuan-Jyh et al. "Syntheses, thermal properties, and phase morphologies of novel benzoxazines functionalized with polyhedral oligomeric silsequioxane (POSS) nanocomposites," Polymer, vol. 45, No. 18, Aug. 19, 2004, pp. 6321-6331.

ASTM D 790-07 Standard Test Methods for Flexural Properties of Unreinforced and Reinforced Plastics and Electrical Insulating Materials, ASTM International, Oct. 2007, pp. 153-163.

ASTM D 5045-99 (Reapproved 2007) Standard Test Methods for Plane-Strain Fracture Toughness and Strain Energy Release Rate of Plastic Materials, ASTM International, Jun. 2007, pp. 783-791.

* cited by examiner

POLYMERIZABLE COMPOSITION

CROSS-REFERENCE TO RELATED APPLICATIONS

This application is a continuation of International Patent Application No. PCT/EP2009/057618 filed Jun. 18, 2009, which claims priority to Germany Patent Application No. 10 2008 032 176.1 filed Jul. 9, 2008, the contents of both of which are incorporated herein by reference.

BACKGROUND OF THE INVENTION

The present invention relates to a polymerizable composition, comprising as a component A, at least one organosilicon compound containing at least two ≡Si—H groups that are reactive in the hydrosilylation reaction and as a component B, a benzoxazine compound containing at least two unsaturated carbon-carbon bonds that are reactive in the hydrosilylation reaction with component A. Further subject matters of the present invention are adhesives, sealants or coatings that comprise the polymerizable composition according to the invention, as well as the polymerization products of said compositions.

Epoxy-based resin systems have been successfully used for a long time in the aeronautical, automotive or electronics industries as adhesives, sealants or for coating surfaces or employed as resin systems with a range of different materials for manufacturing composites.

Benzoxazine-based resin systems generally exhibit a high glass transition temperature and are characterized by their good electrical properties and their positive flame retardant behavior.

Mixtures of epoxy resins and benzoxazine resins are described for example in U.S. Pat. Nos. 4,607,091, 5,021,484 and 5,200,452. The mixtures of the cited resin systems are characterized by their advantageous processability because the epoxy resin decisively reduces the viscosity of the composition. The cited resin systems can be employed in the electronic industry due to inter alia the favorable processability even with high filler contents.

Ternary mixtures of epoxy resins, benzoxazine resins and phenol resins are likewise known. Mixtures of this type are described for example in U.S. Pat. No. 6,207,786.

In addition, mixtures of benzoxazines with materials other than epoxy resins or phenol resins are known. Thus, U.S. Pat. No. 6,620,925 discloses a curable composition, comprising certain benzoxazines and additional curable compounds, for example selected from vinyl ethers, vinylsilanes or from compounds that contain an allyl or vinyl group.

Polymers are likewise known that, in addition to benzoxazine moieties, contain at least one further structural moiety that differs from the first mentioned. Thus, Japanese patent application JP-A-2007-154018 claims benzoxazine-based resin systems that can be manufactured by treating methyl-substituted hexamethylene-diamines with formaldehyde and diphenols. Benzoxazine-based resin systems, manufactured using araliphatic diamines, are known from JP-A 2007-106.

Japanese patent application JP-A-2007-146070 relates to benzoxazine-based resin systems that are manufactured by treating various polysiloxane diamines with formaldehyde and diphenols. The resulting polymers are notably characterized by their good dielectric and mechanical properties.

Silsesquioxane-containing benzoxazine compounds are described by F. C. Chang et al. in "Syntheses, thermal properties, and phase morphologies of novel benzoxazines functionalized with polyhedral oligomeric silsesquioxane (POSS) nanocomposites" Polymer, Elsevier Science Publishers B.V, GB, vol. 45, No. 18, 6321-6331 (2004).

The siloxane group-containing benzoxazine-based resin systems described in the prior art can be thermally polymerized by a self-initiating mechanism or by adding cationic initiators. A later post-crosslinking that is frequently desired in industry, in particular a radical post-crosslinking of the resulting polymers, in order to increase the final strength, is generally not possible. Such a later post-crosslinking is desirable, for example with adhesives, coating agents or sealants.

BRIEF DESCRIPTION OF THE DRAWINGS

FIG. 1($a$) shows the initial spectrum of the pure benzoxazine compound (B-ala). FIG. 1($b$) and FIG. 1($c$) document the advancing reaction course. FIG. 1($d$) illustrates the FT-IR spectrum of the final polymerization product.

FIG. 2($1$) shows the initial spectrum of the pure benzoxazine compound (B-ala). FIG. 2($2$) and FIG. 2($3$) document the advancing reaction course. FIG. 2($4$) illustrates the $^1$H-NMR spectrum of the final polymerization product.

SUMMARY OF THE INVENTION

The present invention achieves the object of providing a polymerizable composition, based on benzoxazine, which exhibits advantageous mechanical properties after polymerization and is available for an additional post-crosslinking, in particular an additional radical post-crosslinking. It is especially desirable that prior to the polymerization reaction, the cited composition exhibits a low viscosity and facile processability.

Accordingly, the subject matter of the present invention is a polymerizable composition, comprising as a component A, at least one organosilicon compound containing at least two ≡Si—H groups that are reactive in the hydrosilylation reaction and as a component B, at least one benzoxazine compound containing at least two unsaturated carbon-carbon bonds that are reactive in the hydrosilylation reaction with component A.

The polymerizable composition of the present invention is particularly suitable for the manufacture of adhesives, sealants or coating agents. Therefore, adhesives, sealants or coating agents that comprise the polymerizable composition according to the invention are a subject matter of the present invention. Further subject matters of the present invention are the polymerization product of the polymerizable composition according to the invention as well as a process for their manufacture.

Another subject matter of the present invention is a curable composition that comprises at least one curable resin component and the polymerization product of the inventive polymerizable composition, as well as the cured product of the curable composition. The cured product is preferably obtained in this case by thermal curing of the curable composition.

A further subject matter of the present invention is process for manufacturing the cured product, wherein the said product embeds a layer or a bundle of fibers, such as for example carbon fibers, and is especially suitable as a composite.

DETAILED DESCRIPTION OF THE INVENTION

In the context of the present invention, the term, "organosilicon compound" includes organosilicon compounds that comprise carbon in addition to silicon.

In the context of the present invention, a ≡Si—H group is understood to mean a group, in which a tetravalent silicon atom is bonded to one hydrogen atom and three further atoms.

The polymerizable composition of the present invention can enter into a polymerization reaction in the form of a polyaddition reaction, wherein the polyaddition reaction especially concerns a hydrosilylation reaction. Here at least two of the hydrosilylation reactive groups of the component A react with component B, therefore with at least one benzoxazine compound that possesses more than at least two unsaturated carbon-carbon bonds that are reactive to the hydrosilylation with component A.

In order to accelerate and increase the efficiency of the described hydrosilylation reaction, the polymerizable composition according to the invention can preferably comprise at least one hydrosilylation catalyst. Mixtures of different hydrosilylation catalysts can likewise be employed.

If in fact used, the hydrosilylation catalyst can be provided in an amount of 1 to 100 000 ppm, based on the total weight of the polymerizable composition. The amount of the hydrosilylation catalyst preferably depends on the activity of the relevant catalyst in the reaction of the components A and B. In particular, catalyst quantities are preferably at least 2 ppm, at least 4 ppm, at least 8 ppm, at least 12 ppm, at least 20 ppm and at least 100 ppm, based on the total weight of the polymerizable composition. Moreover, catalyst quantities are preferably at most 10 000 ppm, at most 1000 ppm, at most 500 ppm and at most 200 ppm, based on the total weight of the polymerizable composition.

Catalysts for the hydrosilylation include metal salts and complexes of transition metals, wherein the transition metal is preferably selected from Pt, Pd, Rh, Ru and Ir. Elements from Group VIII of the periodic table are particularly preferred. Hydrosilylation catalysts can comprise, for example platinum (such as for example $PtCl_2$, dibenzonitrileplatinum dichloride, platinum on charcoal, dichloro(1,2-cyclo-octadiene)platinum(11) $[(COD)PtCl_2]$, available from Strem Chemicals, Inc., New Buryport, Mass. Another platinum catalyst that is suitable in regard to reactivity and cost considerations is hexachloroplatinic acid ($H_2PtCl_6 \cdot 6H_2O$); divinyldisiloxaneplatinum complexes, such as for example the platinum complex of divinyltetramethyldisiloxane, available as PC075 from Hüls America and the platinum-containing catalysts PC072 (a divinylplatinum complex) and PC085, also available from Hüls America, are also suitable. Exemplary suitable rhodium catalysts are $(RhCl(P(C_6H_5)_3)_3)$, [Rh(COD)$_2$]BF$_4$ and [RhCl(nbd)]$_2$, whereas [Ru(benzene)Cl$_2$], [Ru(p-cymene)Cl$_2$] and [Cp*Ru(MeCN)$_3$]PF$_6$ are examples of suitable ruthenium catalysts. Other suitable catalysts are Lewis acids as well as peroxides.

In a preferred embodiment, the at least one organosilicon compound containing at least two ≡S—H groups that are reactive in the hydrosilylation reaction (component A) is selected from the group consisting of cyclic polysiloxanes, linear polysiloxanes, trisiloxysilanes and tetrasiloxysilanes. The cited trisiloxysilanes and tetrasiloxysilanes can include low molecular or oligomeric structures.

Furthermore, two or more than two of the cited organosilicon compounds can be used in combination with each other. Combinations of at least one tetrasiloxysilane with at least one linear polysiloxane or with at least one cyclic polysiloxane are here just as preferred as combinations of at least one trisiloxysilane with at least one linear polysiloxane or with at least one cyclic polysiloxane. Moreover, ternary combinations are preferred, such as for example the combination of at least one cyclic polysiloxane or at least one linear polysiloxane with at least one trisiloxysilane and with at least one tetrasiloxysilane.

In the context of the present invention, mixtures of at least one linear polysiloxane with at least one cyclic polysiloxane can also be used.

In particular, preferred organosilicon compounds containing at least two ≡Si—H groups that are reactive in the hydrosilylation reaction exhibit a weight average molecular weight of 200 to 60 000 g/mol, preferably 600 to 10 000 g/mol and especially 800 to 4000 g/mol.

In a preferred embodiment of the invention, the organosilicon compound comprises a cyclic polysiloxane of the general Formula (I), Formula (I)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen and n is a whole number between 2 and 30.

Preferred cyclic polysiloxanes are for example methylhydrocyclosiloxanes (MHCS) as well as any of their mixtures. Examples include, for example, tetraoctyl-cyclotetrasiloxane and hexamethylcyclotetrasiloxane; tetra- and pentamethylcyclo-tetrasiloxanes; tetra-, penta-, hexa- and heptamethylcyclopentasiloxanes; tetra-, penta- and hexamethylcyclohexasiloxanes, tetraethylcyclotetrasiloxanes and tetraphenylcyclotetrasiloxanes. 1,3,5,7-Tetramethylcyclotetrasiloxane, 1,3,5,7,9-pentamethyl-cyclopentasiloxane and 1,3,5,7,9,11-hexamethylcyclohexasiloxane or any of their mixtures are preferred.

In another preferred embodiment of the invention, the organosilicon compound comprises a linear polysiloxane of the general Formula (II), Formula (II)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen and m is a whole number between 0 and 1000.

In the context of the present invention, linear polysiloxanes are also understood to mean linear, short chain polysiloxanes having ≡Si—H end groups with the general Formula (II.1), Formula (II.1)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms and m' is a whole number between 0 and 100.

Exemplary linear polysiloxanes having end groups with the general Formula (II.1) are preferred, in which R is selected from methyl and m' is 0, 1, 2, 3, 4, 5 or 6.

Furthermore, linear polysiloxanes are preferred, which are linear poly(organohydrosiloxanes) of the general Formula (II.2),

Formula (II.2)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that 1 to 50%, preferably 2 to 50% and especially 5 to 50% of the R groups are hydrogen and m" is a whole number between 2 and 1000.

Exemplary linear poly(organohydrosiloxanes) include: methylhydro-polysiloxanes with trimethylsiloxy end groups, dimethylsiloxane-methylhydrosiloxane copolymers with trimethylsiloxy end groups, dimethylsiloxane-methylhydrosiloxane copolymers with dimethylsiloxy end groups, polydimethylsiloxane with dimethylsiloxy end groups, methyloctylsiloxane-methylhydrosiloxane copolymers with trimethylsiloxy end groups, phenylmethylsiloxane-methylhydrosiloxane copolymers with dimethylsiloxy end groups, 2-phenylethylmethylsiloxane-methylhydrosiloxane copolymers with trimethylsiloxy end groups and 2-(4-methylphenyl)-ethylmethyl-siloxane-methylhydrosiloxane copolymers with trimethylsiloxy end groups.

Linear polysiloxanes of the present invention are commercially available in various molecular weights from Gelest Inc. Morrisville, Pa., for example.

In another preferred embodiment of the invention, the organosilicon compound comprises a trisiloxysilane of the general Formula (III), Formula (III)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen and o and q each stands for a whole number between 0 and 1000 and p is a whole number between 1 and 1000.

Trisiloxanes of the present invention are commercially available in various molecular weights from Gelest Inc. Morrisville, Pa., for example.

In a likewise preferred embodiment of the present invention, the organosilicon compound comprises a tetrasiloxysilane of the general Formula (IV), Formula (IV)

wherein the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen and r and t each stands for a whole number between 0 and 1000 and s is a whole number between 1 and 1000.

Tetrasiloxanes of the present invention are commercially available in various molecular weights from Gelest Inc. Morrisville, Pa., for example.

The polymerizable composition according to the invention further comprises as an additional component, as the component B, at least one benzoxazine compound containing at least two unsaturated carbon-carbon bonds that are reactive in the hydrosilylation reaction with component A.

The benzoxazine compound of the polymerizable composition is preferably a monomer, oligomer or polymer that possesses at least one benzoxazine group and at least two unsaturated carbon-carbon bonds that are reactive in the hydrosilylation reaction with component A. Preferred monomers can preferably contain up to four benzoxazine groups, wherein both individual monomers as well as mixtures of two or more monomers can be used as the benzoxazine compound.

The unsaturated carbon-carbon bonds that are reactive in the hydrosilylation reaction with component A are understood to mean preferably carbon-carbon double bonds and/or carbon-carbon triple bonds. Terminal carbon-carbon double bonds are particularly preferred.

In the context of the present invention, benzoxazine compounds having at least two unsaturated carbon-carbon bonds that are reactive in the hydrosilylation reaction with component A are preferably selected from the group consisting of N-alkenyl- and N-alkynyl-benzoxazine compounds.

In the context of the invention, the abovementioned N-alkenyl- or N-alkynyl-benzoxazine compounds are preferably understood to mean those compounds that contain at least two benzoxazine groups, and in which at least two N atoms of at least two of the oxazine rings each carry an alkenyl or alkynyl group. N-alkenyl- or N-alkynyl-benzoxazine compounds are in particular understood to mean those compounds that contain at least two benzoxazine groups, and in which each N atom of each oxazine ring carries an alkenyl or alkynyl group.

Suitable benzoxazine compounds containing at least two unsaturated carbon-carbon bonds that are reactive in the hydrosilylation reaction with component A are preferably described by Formula (V), Formula (V)

wherein v is a whole number between 2 and 4, u is a whole number between 1 and 10, X is selected from the group consisting of alkylene (for v=2 to 4), carbonyl (for v=2), oxygen (for v=2), sulfur (for v=2), sulfoxide (for v=2), sulfone (for v=2) and a direct, covalent bond (for v=2), $R^2$ is selected from the group consisting of hydrogen and an alkyl group having 1 to 8 carbon atoms, and $R^4$ is selected from the group consisting of hydrogen, halogen, alkyl and alkenyl, or $R^4$ is a divalent group that makes a corresponding naphthoxazine structure from the benzoxazine structure.

Particularly preferred structures according to formula (V) are represented by Formula (V.1),

Formula (V.1)

wherein u is a whole number between 1 and 10, X is selected from the group consisting of alkylene (for v=2 to 4), carbonyl (for v=2), oxygen (for v=2), sulfur (for v=2), sulfoxide (for v=2), sulfone (for v=2) and a direct, covalent bond (for v=2), $R^2$ is selected from the group consisting of hydrogen and an alkyl group having 1 to 8 carbon atoms, and $R^4$ is selected from the group consisting of hydrogen, halogen, alkyl and alkenyl, or $R^4$ is a divalent group that makes a corresponding naphthoxazine structure from the benzoxazine structure.

Quite particularly preferred structures according to formula (V) and Formula (V.1) are represented by Formula (V.2) or Formula (V.3)

Formula (V.2)

Formula (V.3)

wherein u, $R^2$ and $R^4$ in Formula (V.2) and Formula (V.3) each have the above cited meanings.

Likewise preferred benzoxazine compounds containing at least two unsaturated carbon-carbon bonds that are reactive in the hydrosilylation reaction with component A are additional compounds of the general Formula (V.4), Formula (V.4)

wherein u, $R^2$ and $R^4$ each have the abovementioned meanings.

In particularly preferred benzoxazine compounds of the general Formula (V), (V.1), (V.2), (V.3) and (V.4), u is a whole number selected from 1, 2 or 3.

Further preferred benzoxazine compounds containing at least two unsaturated carbon-carbon bonds that are reactive in the hydrosilylation reaction with component A possess only one benzoxazine group. Thus for example, benzoxazine compounds of the general Formula (V.5) can be used, Formula (V.5)

wherein $R^2$ and $R^{2'}$ or u and u can be the same or different and $R^2$ and $R^{2'}$ independently of one another are selected from the group consisting of hydrogen and an alkyl group having 1 to 8 carbon atoms and u and u' each stand for a whole number between 1 and 10, in particular for 1, 2 or 3.

The molar ratio of the component A to the component B in the polymerizable composition according to the invention is preferably in a range 1:10 to 10:1, preferably in a range 1:5 to 5:1 and especially in a range 1:2 to 2:1. Component A and component B in the polymerizable composition according to the invention are most preferably in an equimolar proportion to one another.

In a preferred embodiment of the present invention, the fraction of component A in the total amount of the polymerizable composition according to the invention is between 1 and 80 wt. %, preferably between 20 and 60 wt. % and particularly between 40 and 60 wt. %. In another preferred embodiment of the present invention, the fraction of component B in the total amount of the polymerizable composition according to the invention is between 1 and 80 wt. %, preferably between 20 and 60 wt. % and particularly between 40 and 60 wt. %.

In order to construct linear structures, it is preferred that the at least one organosilicon compound (component A) comprise only two of the hydrosilylation reactive ≡Si—H groups and the at least one benzoxazine compound (component B) likewise possesses only two unsaturated carbon-carbon bonds that are reactive to the hydrosilylation with component A.

In order to construct branched structures, it is further preferred that the at least one organosilicon compound (component A) comprise more than two of the hydrosilylation reactive groups and the at least one benzoxazine compound (component B) possesses more than two unsaturated carbon-carbon bonds that are reactive to the hydrosilylation with component A.

A further subject matter of the present invention is the polymerization product of the polymerizable composition according to the invention. The cited polymerization product is preferably the polyaddition product of the polyaddition reaction of the components A and B.

In the context of the present invention, a polyaddition reaction is preferably understood to mean a hydrosilylation reaction, in which a new Si-carbon bond and a new carbon-hydrogen bond are formed from the addition of a group to an unsaturated carbon-carbon bond.

The cited polymerization product is characterized in that it preferably disposes of terminal unsaturated carbon-carbon bonds and/or terminal ≡Si—H groups as the reactive end groups. These reactive end groups make possible a later post-crosslinking of the obtained polymerization product, whereby, depending on the purpose of use, the final strength, such as for example the impact resistance, the fatigue behavior and/or the compression strength of the polymerization product can be improved or increased.

For example, a radical post-crosslinking can be achieved by reacting the obtained polymerization product with crosslinking agents, wherein the crosslinking agent can be selected for example from the group consisting of polymerizable monomers, oligomers or polymers, in so far as they possess at least two polymerizable groups per molecule, such as for example divinylstyrene. Particularly suitable crosslinking agents are also di-, tri-, tetra- and/or pentaacrylates that can be selected for example from the group consisting of pentaerythritol tetraacrylate (PETTA), trimethylolpropane triacrylate (TMPTA), di-trimethylol propane tetraacrylate (DiTMPTTA), dipentaerythritol pentaacrylate (DiPEPA) or tripropylene glycol diacrylate (TPGDA) or any of their mixtures.

If the polymerization product of the composition according to the invention possesses at least one ≡Si—H group, especially at least one terminal ≡Si—H group, then post-crosslinking, also in the form of a hydrosilylation reaction, can be made, in that the cited polymerization product is preferably treated with at least one monomeric, oligomeric or polymeric crosslinking agent that possesses at least two unsaturated carbon-carbon bonds that are reactive to hydrosilylation.

In a particularly preferred embodiment of the invention, the cited polymerization product comprises a polymer of the general Formula (VI), Formula (VI)

with the proviso that the C1-C2 bond in the terminal position is a double bond and in the non-terminal position is a single bond;

wherein u is a whole number from 1 to 10;
w is a whole number from 1 to 1000;
X is selected from the group consisting of alkylene, carbonyl, oxygen, sulfur, sulfoxide, sulfone and a direct, covalent bond;
the R' groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms, aryloxy groups having 6 to 12 carbon atoms;
$R^2$ is selected from the group consisting of hydrogen and an alkyl group having 1 to 8 carbon atoms;
$R^4$ is selected from the group consisting of hydrogen, halogen, alkyl and alkenyl, or $R^4$ is a divalent group that makes a corresponding naphthoxazine structure from the benzoxazine structure;
Y stands for a direct, covalent bond or is a divalent group that comprises at least one siloxane structural element
    i) of the Formula (VI.1), or

Formula (VI.1)

ii) of the Formula (VI.2), or

Formula (VI.2)

iii) of the Formula (VI.3)

Formula (VI.3)

wherein m' p' and s' each stand for a whole number from 1 to 1000, o' q' r' and t' each stand for a whole number from 0 to 1000, and R' has the meaning given above,
and $R^3$ and $R^5$ independently of one another stand for R' or a group of the general Formula (VI.4), Formula (VI.4)

wherein Y and R' have the abovementioned meanings.

The polymerization reaction for manufacturing the polymerization product according to the invention can be carried out with the use of a solvent or without solvent. Exemplary preferred solvents are toluene, tetrahydrofuran and chloroform.

The reaction temperature essentially depends on the reactivity of the individual components and, in so far present, on the reactivity of the at least one hydrosilylation catalyst.

Preferred reaction temperatures preferably lie in a region of 0° C. to 250° C., preferably 20° C. to 200° C. and especially 22° C. to 100° C.

The reaction is usually carried out under normal pressure, but can also occur under increased pressures, such as, for example, in the range of about 1.5 to 20 bar, or under reduced pressures, such as, for example, 200 to 600 mbar.

For certain purposes it can be required to add a reagent, for example an amine, such as for example diethylenetriamine, to the polymerizable composition in order to slow down the hydrosilylation reaction catalyzed by a hydrosilylation catalyst.

Another subject matter of the present invention is a process for manufacturing the inventive polymerizable composition, comprising the steps:
    a) preparing a polymerizable composition, comprising a component A and component B and optionally at least one hydrosilylation catalyst, wherein component A is an organosilicon compound containing at least two groups that are reactive in the hydrosilylation reaction and component B is at least one benzoxazine compound containing at least two unsaturated carbon-carbon bonds that are reactive in the hydrosilylation reaction with component A;
    b) polymerization of the polymerizable composition in order to manufacture the cited polymerization product.

The cited polymerization product of the inventive polymerizable composition generally exhibits thermoplastic processability and can be cured by ring-opening the benzoxazine structure to afford materials with thermosetting properties. Consequently, the polymerization product can be advantageously used in processes that involve a thermoplastic processability of the material in question, such as for example injection molding or extrusion.

Accordingly, a further subject matter of the present invention is the cured polymerization product of the polymerizable composition according to the invention.

The cited polymerization product or the mixture of different polymerization products can be cured under ring opening of the benzoxazine structure at increased temperatures according to a self-initiating mechanism (thermal polymerization) or by adding cationic initiators.

Suitable exemplary cationic initiators are Lewis acids or other cationic initiators, such as for example metal halides, organometallic reagents, such as metalloporphyrins, methyl tosylates, methyl triflates or trifluorosulfonic acids. Basic reagents can also be used for initiating the polymerization of the polymerizable benzoxazine compound or the mixture of different polymerizable benzoxazine compounds. Suitable exemplary basic reagents can be selected from imidazole or imidazole derivatives.

The cited polymerization product is preferably thermally cured at temperatures of 150° C. to 300° C., especially at temperatures of 160° C. to 220° C. The curing temperature can also be lower when the abovementioned initiators and/or reagents are used. The cured polymerization products are characterized especially by their high thermal stability.

A further subject matter of the present invention is an adhesive, sealant or coating agent, containing the polymerizable composition according to the invention. The inventive adhesives, sealants or coating agents can also be preferably formulated as two-component systems, in which in particular both of the components A and B and optionally the at least one hydrosilylation catalyst are blended together only shortly before application. As already described, the components A and B react together to form a reaction product.

The resulting reaction product can be cured, preferably thermally cured, under ring opening of the benzoxazine structure, wherein thermoset materials are preferably obtained.

The polymerizable composition can be used for sealing and adhesively bonding substrates in a sealing or adhesive process that comprises the following steps:

a) applying the polymerizable composition according to the invention between a substrate S1 and S2 and b) reacting said composition to afford the corresponding polymerization product, wherein the substrates S1 and S2 are identical or different from one another.

The cited polymerization product is preferably the polyaddition product of the components A and B.

In a preferred embodiment of the process, at least one of the substrates S1 or S2 is selected from the group consisting of glass, glass ceramic, concrete, mortar, brick, clinker, ceramic, natural stone, metal or metallic alloys, wood, plastics and paints.

Yet another subject matter of the present invention is the use of the inventive polymerizable composition for manufacturing the reaction product of the components A and B. The cited reaction product is preferably the polyaddition product of the polyaddition reaction of the components A and B.

The polymerization product of the polymerizable composition can also be used as an additive in curable resin formulations.

A further subject matter of the present invention is accordingly a curable composition, comprising a) at least one curable resin component, and b) at least one polymerization product of the polymerizable composition according to the invention.

In the context of the present invention, a curable resin component is preferably understood to mean a thermally curable resin component.

The at least one resin component can in this case be preferably selected from the group consisting of benzoxazine resins, epoxy resins, polyurethane resins, polyester resins, polyamide resins or phenolic resins or from any of their mixtures.

In the context of the present invention, a benzoxazine resin is understood to mean a resin composition that is formed on the basis of benzoxazine compounds and/or benzoxazine-containing compounds.

Preferred benzoxazine compounds are monomers, oligomers or polymers, which comprise at least one benzoxazine group. Preferred monomers can preferably contain up to four benzoxazine groups, wherein both individual monomers as well as mixtures of two or more monomers can be used as the benzoxazine compound.

Several benzoxazine compounds are listed below which contain up to four benzoxazine groups.

Suitable benzoxazine compounds are preferably represented by formula (B-I), (B-I)

wherein o is a whole number between 1 and 4,

X is selected from the group consisting of alkyl (for o=1), alkylene (for o=2 to 4), oxygen (for o=2), thiol (for o=1), sulfur (for o=2), sulfoxide (for o=2), sulfone (for o=2) and a direct, covalent bond (for o=2), $R^1$ is selected from the group consisting of hydrogen, alkyl, alkenyl and aryl, and $R^4$ is selected from the group consisting of hydrogen, halogen, alkyl and alkenyl, or $R^4$ is a divalent group that makes a corresponding naphthoxazine structure from the benzoxazine structure.

Particularly preferred structures according to formula (B-I) are represented by formula

(B-II)

wherein X is selected from the group consisting of $CH_2$, $C(CH_3)_2$, $C=O$, $O$, $S$, $S=O$, $O=S=O$ and a direct, covalent bond, $R^1$ and $R^2$ are the same or different and each are selected from the group consisting of hydrogen, alkyl, in particular methyl, ethyl, n-propyl, i-propyl, n-butyl or i-butyl, alkenyl, in particular allyl, and aryl, and the substituents $R^4$ are the same or different and are each selected from the group consisting of hydrogen, halogen, alkyl and alkenyl, or each $R^4$ is a divalent group that makes a corresponding naphthoxazine structure from the benzoxazine structure.

Preferred benzoxazine compounds according to formula (B-II) are for example benzoxazines according to formula (B-III) to (B-VI), (B-III)

-continued (B-IV)

(B-V)

(B-VI)

wherein $R^1$, $R^2$ and $R^4$ are as described above.

Preferred benzoxazine compounds are in addition compounds of the general formula (B-VII), (B-VII)

wherein p=2, and

Y is selected from the group consisting of biphenyl), diphenylmethane, diphenylisopropane, diphenyl sulfide, diphenyl sulfoxide, diphenyl sulfone, diphenyl ketone, and $R^4$ is selected from the group consisting of hydrogen, halogen, alkyl and alkenyl, or $R^4$ is a divalent group that makes a corresponding naphthoxazine structure from the benzoxazine structure.

Likewise preferred benzoxazine compounds are addition compounds of the general formula (B-VIII) to (B-IX), (B-VIII)

(B-IX)

wherein $R^1$, $R^2$ and $R^4$ are as defined above and $R^3$ is defined like $R^1$ or $R^2$.

In the context of the present invention, exemplary suitable benzoxazine compounds are the following compounds:

(B-XI)

(B-XII)

-continued

(B-XIII)

(B-XIV)

(B-XV)

(B-XVI)

(B-XVII)

(B-XVIII)

In the context of the present invention, suitable benzoxazine compounds are monofunctional as well as multifunctional benzoxazine compounds. Monofunctional benzoxazine compounds are understood to mean those compounds that contain only one benzoxazine group, whereas multifunctional benzoxazine compounds contain more than one benzoxazine group and can preferably comprise up to four benzoxazine groups.

For example, monofunctional benzoxazine compounds can be described by the general formula (XIX), (B-XIX)

wherein R is selected from the group consisting of alkyl, in particular methyl, ethyl, n-propyl, propyl, n-butyl, i-butyl, alkenyl, in particular allyl, and aryl, wherein each of the cited groups is optionally substituted, and
$R^4$ is selected from the group consisting of hydrogen, halogen, alkyl and alkenyl, or $R^4$ is a divalent group that makes a corresponding naphthoxazine structure from the benzoxazine structure.

Preferred monofunctional benzoxazine compounds are described for example by the general formula (B-XX), (B-XX)

wherein $R^1$ is selected from the group consisting of alkyl and alkenyl, wherein each of the cited groups is optionally substituted or interrupted by one or more O, N, S, C=O, COO or NHC=O or by one or more aryl groups,
m is a whole number between 0 and 4, and
$R^{II}$, $R^{III}$, $R^{IV}$, $R^V$ and $R^{VI}$ independently of one another are selected from the group consisting of hydrogen, alkyl and alkenyl, wherein each alkyl or alkenyl group is optionally substituted or interrupted by one or more O, N, S, C=O, COO, or NHC=O or by one or more aryl groups.

In the context of the present invention, exemplary suitable monofunctional benzoxazine compounds are the following compounds (B-XXI) and (B-XXII), (B-XXI)

(B-XXII)

wherein $R^I$ is as described above.

In the context of the present invention, benzoxazine compounds can be obtained from the above described sources or by the above described production processes.

In a preferred embodiment of the invention, the inventive curable composition comprises at least one curable benzoxazine compound or a mixture of different curable benzoxazine resins in amounts of 50 to 99 wt. %, preferably 70 to 95 wt. % and most preferably 80 to 90 wt. %, each based on the total amount of the curable preparation.

In a particularly preferred embodiment, the curable composition contains only one or a plurality of benzoxazine compounds as the curable resin component.

Both the polymerizable benzoxatine compounds of the curable composition as well as the polymerizable benzoxazine compounds of the polymerizable composition having at least two unsaturated carbon-carbon bonds that that are reactive in the hydrosilylation reaction with component A can also partially contain opened ring structures, wherein the opened ring structure is preferably obtained by formally breaking the covalent bond between A and N or between B and B' (see formula B-O).

(B-O)

Further examples of ring opened benzoxazine compounds are shown below:

In the context of the present invention, the ring-opened structures are also valid benzoxazine compounds, especially as ring-opened benzoxazine compounds.

In the context of the present invention, benzoxazine resins are particularly preferred as the curable resin components of the curable composition.

In the context of the invention, an "epoxy resin" is understood to mean a resin composition that is formed based on epoxide compounds or epoxide-containing compounds. In a preferred embodiment of the invention, the epoxide compounds or epoxide-containing compounds of the epoxy resin system of the curable preparation can include both oligomeric as well as monomeric epoxide compounds as well as epoxides of the polymeric type, and can be aliphatic, cycloaliphatic, aromatic or heterocyclic compounds. In the context of the present invention, exemplary suitable epoxy resin systems are preferably selected from epoxy resins of the bisphenol-A type, epoxy resins of the bisphenol-S type, epoxy resins of the bisphenol-F type, epoxy resins of the phenol-novolak type, epoxy resins of the cresol-novolak type, epoxidized products of numerous dicyclopentadiene-modified phenol resins, obtained by treating dicyclopentadiene with numerous phenols, epoxidized products of 2,2',6,6'-tetra-methylbiphenol, aromatic epoxy resins such as epoxy resins with naphthalene basic structure and epoxy resins with fluorene basic structure, aliphatic epoxy resins such as neopentyl glycol diglycidyl ether and 1,6-hexane diol diglycidyl ether, alicyclic epoxy resins such as 3,4-epoxycyclohexylmethyl-3,4-epoxycyclohexane carboxylate and bis(3,4-epoxycyclohexyl)adipate, and epoxy resins with a heterocycle such as triglycidyl isocyanurate.

In particular, the epoxy resins include for example the reaction product from Bisphenol A and epichlorohydrin, the reaction product of phenol and formaldehyde (Novolak resins) and epichlorohydrin, glycidyl esters as well as the reaction product from epichlorohydrin and p-aminophenol. Further preferred epoxy resins that are commercially available include in particular octadecylene oxide, epichlorohydrin, styrene oxide, vinylcyclohexene oxide, glycidol, glycidyl methacrylate, diglycidyl ether of bisphenol A (e.g. those obtainable under the trade names "Epon 828", "Epon 825", "Epon 1004" and "Epon 1010" from Hexion Specialty Chemicals Inc., "DER-331", "DER-332", "DER-334", "DER-732" and "DER-736" from Dow Chemical Co.), vinylcyclohexene dioxide, 3,4-epoxycyclohexylmethyl-3,4-epoxycyclohexene carboxylate, bis(3,4-epoxy-6-methylcyclohexylmethyl)adipate, bis(2,3-epoxycyclo-pentyl)ether, aliphatic epoxide, modified with polypropylene glycol, dipentene dioxide, epoxidized polybutadiene (e.g. Krasol products from Sartomer), silicone resins containing epoxide functionality, flame-retardant epoxy resins (e.g. "DER-580", a brominated epoxy resin of the Bisphenol type, which can be obtained from Dow Chemical Co.), 1,4-butane diol diglycidyl ether of a phenol-formaldehyde Novolak (e.g. "DEN-431" and "DEN-438" from Dow Chemical Co.), as well as resorcinol diglycidyl ether (e.g. "Kopoxite" from the Koppers Company Inc.), bis(3,4-epoxycyclohexyl)adipate, 2-(3,4-epoxycyclohexyl-5,5-spiro-3,4-epoxy)cyclohexane meta-dioxane, vinylcyclohexene monoxide, 1,2-epoxyhexadecane, alkyl glycidyl ethers such as e.g. C8-C10 alkyl glycidyl ether (e.g. "HELOXY Modifier 7" from Hexion Specialty Chemicals Inc.), C12-C14 alkyl glycidyl ether (e.g. "HELOXY Modifier 8" from Hexion Specialty Chemicals Inc.), butyl glycidyl ether (e.g. "HELOXY Modifier 61" from Hexion Specialty Chemicals Inc.), cresyl glycidyl ether (e.g. "HELOXY Modifier 62" from Hexion Specialty Chemicals Inc.), p-tert.-butylphenyl glycidyl ether (e.g. "HELOXY Modifier 65" from Hexion Specialty Chemicals Inc.), polyfunctional glycidyl ethers such as e.g. diglycidyl ether of 1,4-butane diol (e.g. "HELOXY Modifier 67" from Hexion Specialty Chemicals Inc.), diglycidyl ethers of neopentyl glycol (e.g. "HELOXY Modifier 68" from Hexion Specialty Chemicals Inc.), diglycidyl ethers of cyclohexane dimethanol (e.g. "HELOXY Modifier 107" from Hexion Specialty Chemicals Inc.), trimethylolethane triglycidyl ether (e.g. "HELOXY Modifier 44" from Hexion Specialty Chemicals Inc.), trimethylolpropane triglycidyl ether (e.g. "HELOXY Modifier 48" from Hexion Specialty Chemicals Inc.), polyglycidyl ethers of an aliphatic polyol (e.g. "HELOXY Modifier 84" from Hexion Specialty Chemicals Inc.), polyglycol diepoxide (e.g. "HELOXY Modifier 32" from Hexion Specialty Chemicals Inc.), Bisphenol F epoxides (e.g. "EPN-1138" or GY-281" from Huntsman Int. LLC), 9,9-bis-4-(2,3-epoxypropoxy)-phenylfluorenone (e.g. "Epon 1079" from Hexion Specialty Chemicals Inc.).

Further preferred commercially available compounds are for example selected from Araldite™ 6010, Araldit™ GY-281™, Araldit™ ECN-1273, Araldit™ ECN-1280, Araldit™ MY-720, RD-2 from Huntsman Int. LLC; DEN™ 432, DEN™ 438, DEN™ 485 from Dow Chemical Co., Epon™ 812, 826, 830, 834, 836, 871, 872, 1001, 1031 etc. from Hexion Specialty Chemicals Inc. and HPT™ 1071, HPT™ 1079 also from Hexion Specialty Chemicals Inc., in addition as the Novolak resins e.g. Epi-Rez™ 5132 from Hexion Specialty Chemicals Inc., ESCN-001 from Sumitomo Chemical, Quatrex 5010 from Dow Chemical Co., RE 305S from Nippon Kayaku, Epiclon™ N673 from DaiNippon Ink Chemistry or Epicote™ 152 from Hexion Specialty Chemicals Inc.

In one embodiment of the invention, the inventive curable composition comprises at least one curable epoxy resin or a mixture of different curable epoxy resins in amounts of 50 to 99 wt %, preferably 70 to 95 wt % and most preferably 80 to 90 wt %, each based on the total amount of the curable preparation.

For certain applications it can be advantageous for the curable composition to comprise a mixture of different curable resin components. In such cases, exemplary particularly preferred mixtures are mixtures of benzoxazine and epoxy resins and/or mixtures of benzoxazine, epoxy and phenol resin resins.

For mixtures of different resin components, such as for example mixtures of at least one benzoxazine resin and at least one epoxy resin, it is particularly preferred that the fraction of all resin components in the total amount of the curable composition is between 50 and 99 wt %, preferably between 70 and 95 wt % and most preferably between 80 and 90 wt %.

In another preferred embodiment of the invention, the curable composition comprises at least one polymerization product of the polymerizable composition according to the invention in amounts of 0.001 to 20 wt %, preferably 1 to 15 wt % and most preferably 5 to 10 wt %, each based on the total amount of the curable composition.

The curable compositions according to the invention can comprise additives, such as preferably colorants and/or fillers, such as e.g. ground or precipitated chalks, carbon black, calcium magnesium carbonates, barytes and in particular silicate fillers of the aluminum-magnesium-calcium silicate type, e.g., wollastonite, chlorite.

In addition, the curable compositions according to the invention may comprise further additives, such as for example auxiliaries and additives such as for example plasticizers, reactive diluents, impact modifiers, rheological aids, wetting agents, antioxidants, stabilizers and/or pigments. The curable compositions according to the invention are, however, preferably free of plasticizers.

Preferred curable compositions according to the invention include, based on the total amount of the curable composition:
(i) 1 to 20 wt % of at least one polymerization product of the polymerizable composition according to the invention,
(ii) 50 to 99 wt % of at least one curable resin component, for example selected from benzoxazine resins and epoxy resins and/or from any of their mixtures and
(iii) 0 to 30 wt % of at least one additive.

The curable composition can be cured, for example at increased temperatures according to a self-initiating mechanism (thermal polymerization) or by adding cationic initiators.

Suitable exemplary cationic initiators are Lewis acids or other cationic initiators, such as for example metal halides, organometallic reagents, such as metalloporphyrins, methyl tosylates, methyl triflates or trifluorosulfonic acids. Basic reagents can also be used for initiating the polymerization of the polymerizable benzoxazine compound or the mixture of different polymerizable benzoxazine compounds. Suitable exemplary basic reagents can be selected from imidazole or imidazole derivatives.

The curable composition according to the invention, in particular a curable composition according to the invention that comprises benzoxazine resins as the curable resin component, is preferably cured at temperatures of 150° C. to 300° C., especially at temperatures from 160° C. to 220° C. The polymerization temperature can also be lower when the abovementioned initiators and/or other reagents are used.

For curable compositions that comprise benzoxazine resins as the curable resin component, the curable composition according to the invention is cured to form the cured product preferably by ring opening, especially by thermally induced ring opening of the benzoxazine system.

A further subject matter of the present invention is the cured product of the curable composition according to the invention.

The use of the polymerization product according to the invention in the curable composition can afford an effective impact modification of the cured product, the cited product being additionally characterized by its low tendency to absorb water.

It is worthy of note that a significant increase in the critical stress intensity factor K1c and in the critical energy release rate G1c are obtained, compared with unmodified cured products.

The flexural strength and the flexural modulus can be measured in accordance with ASTM D790, wherein for each specimen sized 90 mm×12.7 mm×3.2 mm, span=50.8 mm a speed=1.27 mm/min is used.

The critical stress intensity factor K1c and the critical energy release rate G1c can be determined in accordance with ASTM D5045-96 using the "single edge notch bending (SENB)", wherein 56 mm×12.7 mm×3.2 mm specimens are used.

In a preferred embodiment of the invention, the inventive cured product of the curable composition embeds a layer or a bundle of fibers, wherein the fibers are treated with the curable composition according to the invention prior to curing.

Accordingly, a further subject matter of the present invention is a process for manufacturing the cured product of the curable composition according to the invention, wherein the cured composition embeds a layer or a bundle of fibers.

The process according to the invention includes the steps:
(a) preparing at least one layer or at least one bundle of fibers;
(b) providing a curable composition according to the invention;
(c) producing a composite system by treating at least one layer or at least one bundle of fibers with the curable composition;
(d) optionally removing an excess amount of the curable composition from the composite system,
wherein the cured product is obtained, in that the composite system is exposed to increased temperature and increased pressure.

Said fibers are preferably selected from glass fibers, carbon fibers, Aramid fibers, boron fibers, aluminum oxide fibers, silicon carbide fibers. A mixture of two or more of these fibers can be used. For manufacturing a product with lower density and higher durability, the use of carbon fibers is particularly preferred.

In the context of the present invention, the layer or the bundle of fibers does not have a specific shape or configuration, and thus, for example, long fibers aligned in a parallel direction, towpregs, wovens (fabrics), mats, knitted fabric, braids can be used.

Due to their low density and high structural strength, the composite systems, which are manufactured according to said process in the form of fiber-reinforced composite materials, in particular in the form of prepregs or towpregs, can be used for example in aircraft construction or in the automobile industry.

The following examples serve to describe the invention in more detail.

EXAMPLES

Reagents Used

| | |
|---|---|
| 4,4'-Isopropylidene diphenol | (Aldrich, 97%, CAS 80-05-7) |
| 1,1,3,3-Tetramethyldisiloxane | (Aldrich, 97%, CAS 3277-26-7) |
| Pt(0)-1,3-divinyl-1,1,3,3-tetramethyldisiloxane solution in xylene | (Aldrich, ~2% Pt, CAS 68478-92-2) |
| Allylamine | (Aldrich, ≧99%, CAS 107-11-9) |
| Paraformaldehyde | (Acros, 96%) |
| Sodium hydroxide | (Acros, 97*%) |
| Methanol | (Aldrich, ≧99%) |
| Diethyl ether | (Aldrich, ≧99%) |
| 1,4-Dioxane | (Aldrich, ≧99%) |
| Toluene | (Aldrich, 99%) |
| Sodium sulfate | (Acros, 99%) |
| Chloroform | (Acros, ≧99%) |

Synthesis of a benzoxazine compound (B-ala) having at least two unsaturated carbon-carbon bonds.

(B-ala)

To a solution of allylamine (0.54 mol, 30.8 g) in 1,4-dioxane (200 ml) in an ice-cooled 250 ml flask was slowly added paraformaldehyde (1.08 mol, 32.5 g). After stirring for 10 minutes, 4,4'-isopropylidene diphenol (0.27 mol, 61.6 g) was likewise added with ice cooling and the reaction mixture was heated under reflux for 24 hours. The 1,4-dioxane solvent was then removed and diethyl ether (200 ml) was added to the resulting crude product, which was washed several times with an aqueous sodium hydroxide solution (0.1 N) and distilled water. After drying over sodium sulfate and removal of the solvent, the resulting yellow oil was taken up in methanol and water was added. After the solution had become cloudy, the solvent was decanted off when cold and the solid residue was washed with water. After drying under a vacuum at 60° C., the benzoxazine compound (B-ala) was obtained in 62% yield.

2) Synthesis of the Polymerization Product of the Polymerizable Composition.

To a solution of the benzoxazine compound (B-ala) (0.50 g, 1.28 mol) in toluene (25 mL) in a 100 mL three-necked flask, equipped with a reflux column and a gas inlet, was added 6 drops of a solution of the complex Pt(0)-1,3-divinyl-1,1,3,3-tetramethyldisiloxane solution in xylene (~2% Pt) and stirred at room temperature for 15 minutes. 1,1,3,3-Tetramethyldisiloxane (0.17 g, 1.28 mol) was then added and the reaction mixture was heated to 90° C. for a certain period of time. At the conclusion of the reaction, all volatiles were removed in a rotary evaporator and the resulting crude product was dried at 50° C. under vacuum for 3 hours. The crude product was then taken up in toluene and the resulting solution was added to a large excess of methanol. Under ice cooling a solid precipitated out which once separated was dried at 50° C. under vacuum for 3 hours.

Table 1 shows the yields of the individual polymerization products as a function of the reaction time

TABLE 1

Yields as a function of reaction time

| Polymerization product | Reaction time [h] | Yield [%] |
|---|---|---|
| Polymer 1 | 2 | 43 |
| Polymer 2 | 24 | 24 |
| Polymer 3 | 72 | 33 |

3) Analytical Data and Properties

The chemical structure of the benzoxazine compound (B-ala) and the reaction course of the polymerization reaction were determined by means of FT-IR and 1H-NMR spectroscopic techniques.

1H-NMR spectroscopic measurements were carried out with a AC250 (250.133 MHz) in CDCl3 with TMS as the internal standard.

FT-IR spectroscopic measurements were carried out with a Perkin-Elmer FT-IR Spectrum One spectrometer.

Figure 1:
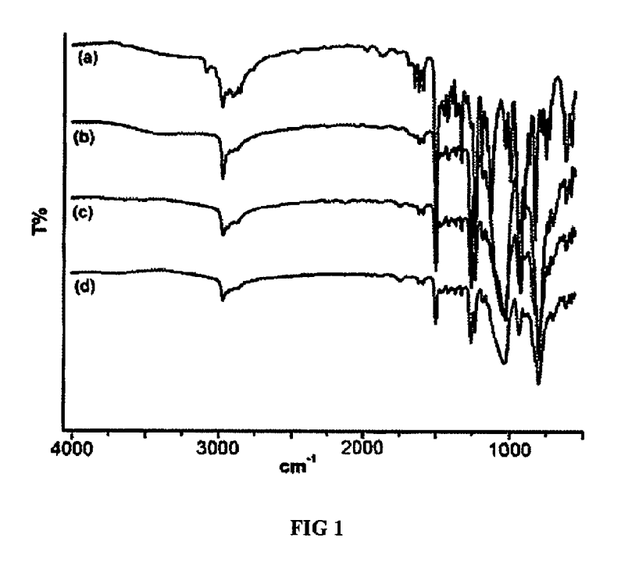
FIG. 1 shows FT-IR absorption spectra at various reaction times.

FIG. 1 shows FT-IR absorption spectra at various reaction times. FIG. 1(a) shows the initial spectrum of the pure benzoxazine compound (B-ala), whereas FIG. 1(b) and FIG. 1(c) document the advancing reaction course and FIG. 1(d) illustrates the FT-IR spectrum of the final polymerization product.

Figure 2:
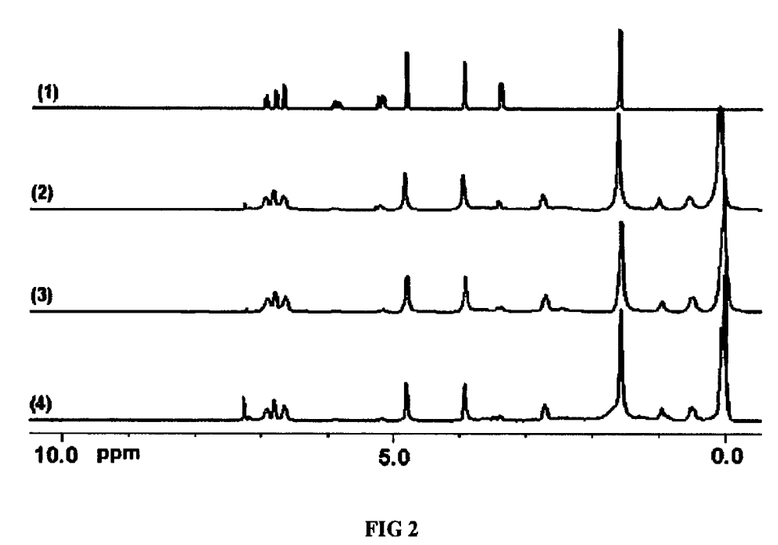
FIG. 2 shows $^1$H-NMR spectra at various reaction times.

FIG. 2 shows 1H-NMR spectra at various reaction times. FIG. 2(1) shows the initial spectrum of the pure benzoxazine compound (B-ala), whereas FIG. 2(2) and FIG. 2(3) document the advancing reaction course and FIG. 2(4) illustrates the 1H-NMR spectrum of the final polymerization product.

FIG. 1(a) shows the characteristic absorption peaks of the benzoxazine group at 1226 cm-1, 1321 cm-1 and 921 and 1496 cm-1. The absorption peak of the allyl group is seen at 3076 cm-1 and 1642 cm-1.

FIG. 2(1) shows characteristic multiplets for the allyl group at 5.2-5.3 ppm and 5.6-5.9 ppm. The —CH2 signals of the allyl group are visible as doublets at 3.4 ppm.

It can be seen from FIG. 1 that the characteristic signals for the allyl group at 3076 cm-1 and 1642 cm-1 significantly weaken in intensity over the course of the polymerization reaction. Simultaneously, the appearance of the absorption peak at 1019-1035 cm-1 (Si—O—Si— stretching vibration) supports the incorporation of a siloxane structural element into the polymerization product.

These observations are confirmed by the 1H-NMR spectra shown in FIG. 2. In particular, FIG. 2(4) reveals the essential disappearance of the allylic double bond with the simultaneous detection of the characteristic Si-alkyl proton signals between 0 and 2.7 ppm.

Accordingly, both FIG. 1 as well as FIG. 2 clearly demonstrate that the polymerization products are formed in a hydrosilylation reaction involving the benzoxazine allyl group. The characteristic signals assigned to the allyl group in the polymerization product (cf. FIG. 1(d) and FIG. 2(4)) further reveal that the resulting polymerization products possess terminal allyl groups.

4) Thermal Curing.

The polymerization products (Polymer 1, Polymer 2, Polymer 3) of the described reaction can moreover be thermally cured under ring opening of the benzoxazine structure. The resulting products (therm-Polymer 1, therm-Polymer 2 and therm-Polymer 3) exhibit a high thermal stability.

The cited polymerization products are preferably cured in a closed mold within 1 to 6 hours in a circulating air oven at temperatures of 150 to 300° C., especially at temperatures of 160 to 220° C. The polymerization products are then removed from the mold and cooled down to room temperature.

Table 2 shows the curing temperatures determined by DSC (Differential Scanning calorimetry).

TABLE 2

DSC data of the thermal curing

| Polymer | $T_{onset}$ [° C.] | $T_{max}$ [° C.] |
|---|---|---|
| B-ala | 208 | 227 |
| Polymer-1 | 202 | 228 |
| Polymer-2 | 201 | 249 |
| Polymer-3 | 203 | 247 |

The DSC measurements were carried out under a nitrogen flow with an Elmer Diamond DSC at a heating rate of 20° C./min.

Tonset is understood to mean the activation temperature of the thermal curing which is obtained from the intersection of the tangent of the inflection point of a relevant peak with the temperature axis. $T_{max}$ is understood to mean the temperature, at which the peak maximum is observed in the DSC diagram for the relevant substance.

The thermal stability of the thermally cured products therm-Polymer 1, therm-Polymer 2 and therm-Polymer 3 was determined by TGA (Thermogravimetric Analysis). It can be seen that the cited cured products have a higher thermal stability than the thermally cured product therm-(B-ala) of the benzoxazine compound.

The thermal properties are presented in Table 3.

TABLE 3

Results of the Thermogravimetric Analyses (TGA)

| Cured products | $T_{5\%}$ [° C.] | $T_{10\%}$ [° C.] | $Y_c$ at 800° C. [%] |
|---|---|---|---|
| therm-(B-ala) | 357 | 369 | 29 |
| therm-polymer-1 | 351 | 400 | 58 |
| therm-polymer-2 | 356 | 403 | 61 |
| therm-polymer-3 | 361 | 398 | 61 |

T5% is understood to mean the temperature, at which the total weight of the relevant sample has lost 5% in comparison with the initial total weight of the relevant sample.

T10% is understood to mean the temperature, at which the total weight of the relevant sample has lost 10% in comparison with the initial total weight of the relevant sample.

Yc is understood to mean the char yield, that is: the proportion of the charred residue (carbonization at 800° C.) of a sample to the original total weight of the sample.

The thermogravimetric analyses (TGA) were carried out under a nitrogen flow with a Perkin-Elmer Diamond TA/TGA at a heating rate of 10° C./min.

The invention claimed is:

1. A polymerizable composition, comprising
   a) as component A, at least one organosilicon compound containing at least two ≡Si—H groups that are reactive in a hydrosilylation reaction and
   b) as component B, at least one benzoxazine compound containing at least two unsaturated carbon-carbon bonds that are reactive in a hydrosilylation reaction with component A.

2. The polymerizable composition according to claim 1 comprising at least one hydrosilylation catalyst.

3. The polymerizable composition according to claim 1 wherein the organosilicon compound is selected from the group consisting of cyclic polysiloxanes, linear polysiloxanes, trisiloxysilanes and tetrasiloxysilanes.

4. The polymerizable composition according to claim 3, wherein the organosilicon compound comprises a cyclic polysiloxane of the general Formula (I), Formula (I)

wherein
the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms,
with the proviso that in each case one R group on at least two silicon atoms is hydrogen,
and n is a whole number between 2 and 30.

5. The polymerizable composition according to claim 3 wherein the organosilicon compound comprises a linear polysiloxane of the general Formula (II),

Formula (II)

wherein
the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen, and m is a whole number between 0 and 1000.

6. The polymerizable composition according to claim 3 wherein the organosilicon compound comprises a trisiloxysilane of the general Formula (III), Formula (III)

wherein
the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen, and o and q each stands for a whole number between 0 and 1000, and p is a whole number between 1 and 1000.

7. The polymerizable composition according to claim 3 wherein the organosilicon compound comprises a tetrasiloxysilane of the general Formula (IV), Formula (IV)

wherein
the R groups can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms and aryloxy groups having 6 to 12 carbon atoms, with the proviso that in each case one R group on at least two silicon atoms is hydrogen, and r and t each stands for a whole number between 0 and 1000, and s is a whole number between 1 and 1000.

8. The polymerizable composition according to claim 1 wherein the benzoxazine compound is a compound of the general Formula (V), Formula (V)

wherein
v is a whole number between 2 and 4, u is a whole number between 1 and 10,

X is selected from the group consisting of alkylene (for v=2 to 4), carbonyl (for v=2), oxygen (for v=2), sulfur (for v=2), sulfoxide (for v=2), sulfone (for v=2) and a direct, covalent bond (for v=2), $R^2$ is selected from the group consisting of hydrogen and an alkyl group having 1 to 8 carbon atoms, and $R^4$ is selected from the group consisting of hydrogen, halogen, alkyl and alkenyl, or $R^4$ is a divalent group that makes a corresponding naphthoxazine structure from the benzoxazine structure.

9. A polymerization product of the polymerizable composition according to claim 1.

10. The polymerization product according to claim 9 comprising a polymer of the general Formula (VI), Formula (VI)

with the proviso that the C1-C2 bond in the terminal position is a double bond and in the non-terminal position is a single bond, wherein u is a whole number from 1 to 10, w is a whole number from 1 to 1000, X is selected from the group consisting of alkylene, carbonyl, oxygen, sulfur, sulfoxide, sulfone and a direct, covalent bond, wherein the groups R' can be the same or different and are each selected from hydrogen, alkyl groups having 1 to 8 carbon atoms, cycloaliphatic groups having 1 to 8 carbon atoms, aryl groups having 6 to 12 carbon atoms, alkoxy groups having 1 to 8 carbon atoms, aryloxy groups having 6 to 12 carbon atoms, $R^2$ is selected from the group consisting of hydrogen and an alkyl group having 1 to 8 carbon atoms, $R^4$ is selected from the group consisting of hydrogen, halogen, alkyl and alkenyl, or $R^4$ is a divalent group that makes a corresponding naphthoxazine structure from the benzoxazine structure,

Y stands for a direct, covalent bond or is a divalent group that comprises at least one siloxane structural element i) of the Formula (VI.I), or

Formula (VI.1)

ii) of the Formula (VI.2), or

Formula (VI.2)

iii) of the Formula (VI.3)

Formula (VI.3)

wherein m' p' and s' each stand for a whole number from 1 to 1000, o' q' r' and t' each stand for a whole number from 0 to 1000, R' has the meaning given above and $R^3$ and $R^5$ independently of one another stand for R' or a group of the general Formula (VI.4), Formula (VI.4)

wherein Y and R' have the abovementioned meaning.

11. An adhesive, sealant or coating, comprising a cured product of the polymerization product of the polymerizable composition according to claim 1.

12. A process for manufacturing a polymerization product comprising the steps:
a) preparing a polymerizable composition, comprising a component A and component B and optionally at least one hydrosilylation catalyst, wherein component A is an organosilicon compound containing at least two ≡Si—H groups that are reactive in the hydrosilylation reaction and component B is at least one benzoxazine compound containing at least two unsaturated carbon-carbon bonds that are reactive in the hydrosilylation reaction with component A;
b) polymerization of the polymerizable composition in order to manufacture the cited polymerization product.

13. The cured product of the curable composition according to claim 12.

14. The process for manufacturing a cured product, comprising the steps:
a) preparing at least one layer or at least one bundle of fibers;
b) preparing a polymerizable composition, comprising a component A and component B and optionally at least one hydrosilylation catalyst, wherein component A is an organosilicon compound containing at least two ≡Si—H groups that are reactive in the hydrosilylation reaction and component B is at least one benzoxazine compound containing at least two unsaturated carbon-carbon bonds that are reactive in the hydrosilylation reaction with component A;
c) producing a composite system by treating at least one layer or at least one bundle of fibers with the curable composition;
d) optionally removing an excess amount of the curable composition from the composite system,
wherein the cured product is obtained, in that the composite system is exposed to increased temperature and increased pressure.

15. The cured product made according to the process of claim 14.

* * * * *